US009350210B2

(12) United States Patent
Zgaga et al.

(10) Patent No.: US 9,350,210 B2
(45) Date of Patent: May 24, 2016

(54) SPARK SUPPRESSION SHIELD FOR ELECTRIC MOTORS

(71) Applicant: NELA razvojni center d.o.o., Zelezniki (SI)

(72) Inventors: Simon Zgaga, Zelezniki (SI); Igor Markic, Skofja Loka (SI); Martin Arnolj, Poljane nad Skofjo Loko (SI); Matjaz Cemazar, Sorica (SI)

(73) Assignee: NELA RAZVOJNI CENTER D.O.O., Zelezniki (SI)

( * ) Notice: Subject to any disclaimer, the term of this patent is extended or adjusted under 35 U.S.C. 154(b) by 132 days.

(21) Appl. No.: 14/230,544

(22) Filed: Mar. 31, 2014

(65) Prior Publication Data

US 2014/0292127 A1    Oct. 2, 2014

(30) Foreign Application Priority Data

Mar. 31, 2013    (SI) .................... P-201300083

(51) Int. Cl.
*H02K 5/136* (2006.01)
*H02K 5/14* (2006.01)
*H02K 5/173* (2006.01)

(52) U.S. Cl.
CPC .............. *H02K 5/136* (2013.01); *H02K 5/148* (2013.01); *H02K 5/1732* (2013.01)

(58) Field of Classification Search
CPC .......... H02K 5/136; H02K 5/148; H02K 5/10
USPC ............................... 310/219–248, 88
See application file for complete search history.

(56) References Cited

U.S. PATENT DOCUMENTS

| | | | | | |
|---|---|---|---|---|---|
| 4,464,593 | A | * | 8/1984 | Kofink | H02K 5/10 277/419 |
| 4,978,876 | A | * | 12/1990 | Koster | H02K 5/148 310/239 |
| 5,424,600 | A | * | 6/1995 | Ishikawa | H02K 5/136 310/220 |
| 6,417,595 | B1 | * | 7/2002 | Wasson | H02K 5/10 310/220 |
| 2005/0121987 | A1 | * | 6/2005 | Ritzinger | H02K 5/128 310/68 B |
| 2008/0030098 | A1 | * | 2/2008 | Shawcross | H02K 5/148 310/239 |

* cited by examiner

*Primary Examiner* — Naishadh Desai
(74) *Attorney, Agent, or Firm* — Jeffrey D. Myers; Peacock Myers, P.C.

(57) ABSTRACT

Spark suppression shield for electric motors relates to universal commutator motors and to permanent magnet DC motors operating in environment containing flammable or explosive gases. The collar shaped as a wall is extending from bearing frame and surrounding commutator in approximately it's total height, where the gap in radial direction between commutator and collar is up to 3 mm and the collar might or might not have collar openings.

4 Claims, 4 Drawing Sheets

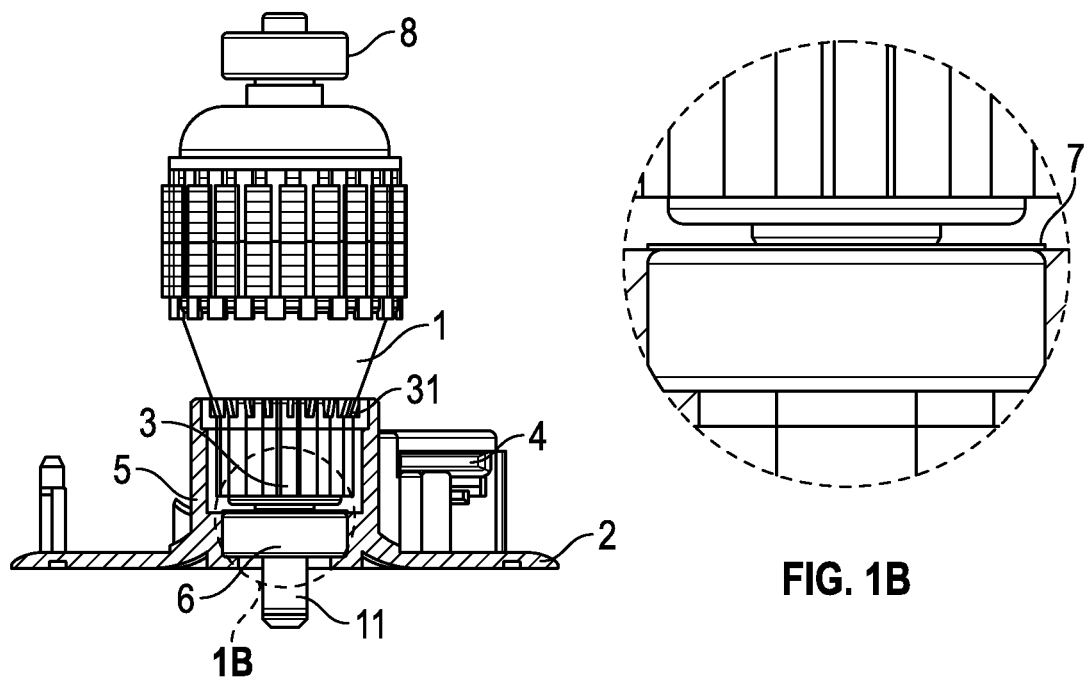
FIG. 1B
FIG. 1A
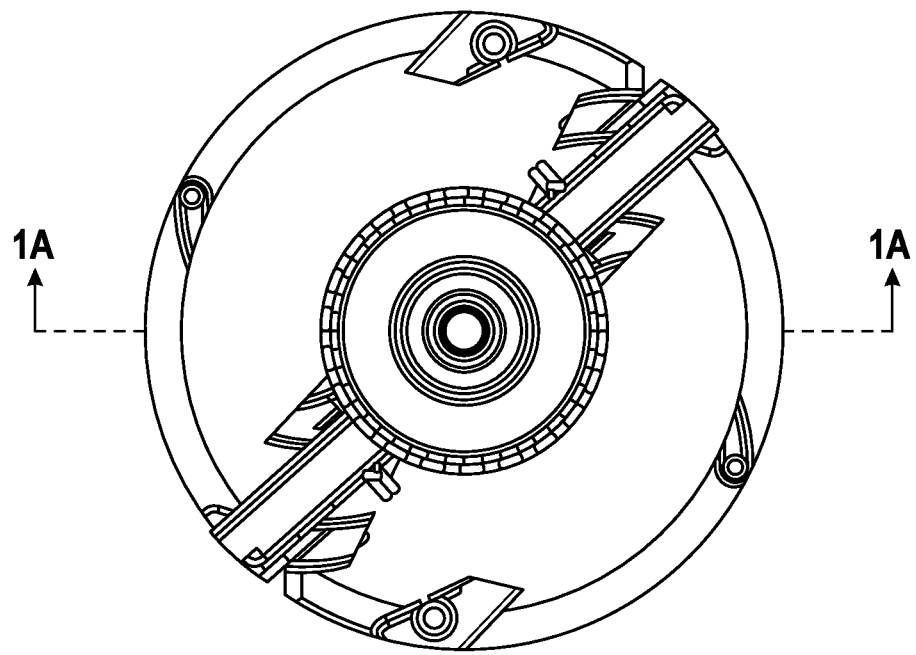
FIG. 1C

SPARK SUPPRESSION SHIELD FOR ELECTRIC MOTORS

CROSS-REFERENCE TO RELATED APPLICATIONS

This application claims priority to and the benefit of the filing of Slovene Patent Application No. P-201300083, filed Mar. 31, 2013, entitled "Spark suppression shield for electric motors", and the specifications and claims thereof are incorporated herein by reference.

FIELD OF THE INVENTION

The present invention relates to the field of electric universal commutator motors and to permanent magnet DC motors operating in environment containing flammable or explosive gases.

BACKGROUND OF THE INVENTION

In all electrical motors containing commutator and brushes, the contact between commutator and conductive brushes, is a source of sparking. If such motor operates in environment containing flammable gases, it might lead to a fire or even to an explosion.

Well known solutions to prevent explosion are totally sealed motors. First disadvantage of such solution is poor dissipation of heat. Consequentially, for same output power, a larger and more expensive motor is needed. Second disadvantage is the brush dust which remains inside the motor. Brush dust is conductive and could be a reason for leakage current. Brush dust can be a also reason for premature bearing failure.

Another solution to prevent the explosion is described in U.S. Pat. No. 6,417,595 B1 applied by McMillan Electric Company. Main elements which provide protection are the collar embracing commutator, the seal on one said of the commutator and the labyrinth on the other side of the commutator. This solution is more cost effective as totally sealed motor.

SUMMARY OF THE INVENTION

Subject of the invention is new solution which enables operation of universal commutator motors and permanent magnet DC motors in environment containing flammable gases. There is a shield, in the form of a collar which is surrounding commutator in radial direction. Disadvantage of this protection is that the brush dust gets trapped inside the collar. Openings in the collar are introduced in order that said brush dust can be drifted away from the commutator and from the bearing region. Openings are located in a direction of rotation as far away as possible from the brushes. This solution is simpler and more cost effective comparing to the existing ones. The commutator is not totally sealed. Despite this it still enables explosion protection in accordance with the standard UL1604, Section 10 and 11.5.

BRIEF DESCRIPTION OF THE DRAWINGS

Drawing 1: General cross-sectional view,
Drawing 2: Perspective view of the bearing frame with the collar openings—opened type,
Drawing 3: Perspective view of the bearing frame with the collar openings—closed type,
Drawing 4: Perspective view & cross-sectional view of the bearing frame with partially opened channels,
Drawing 5: Perspective view & cross-sectional view of the bearing frame with totally closed channels.

DETAILED DESCRIPTION OF THE PREFERRED EMBODIMENT

Figure 2:
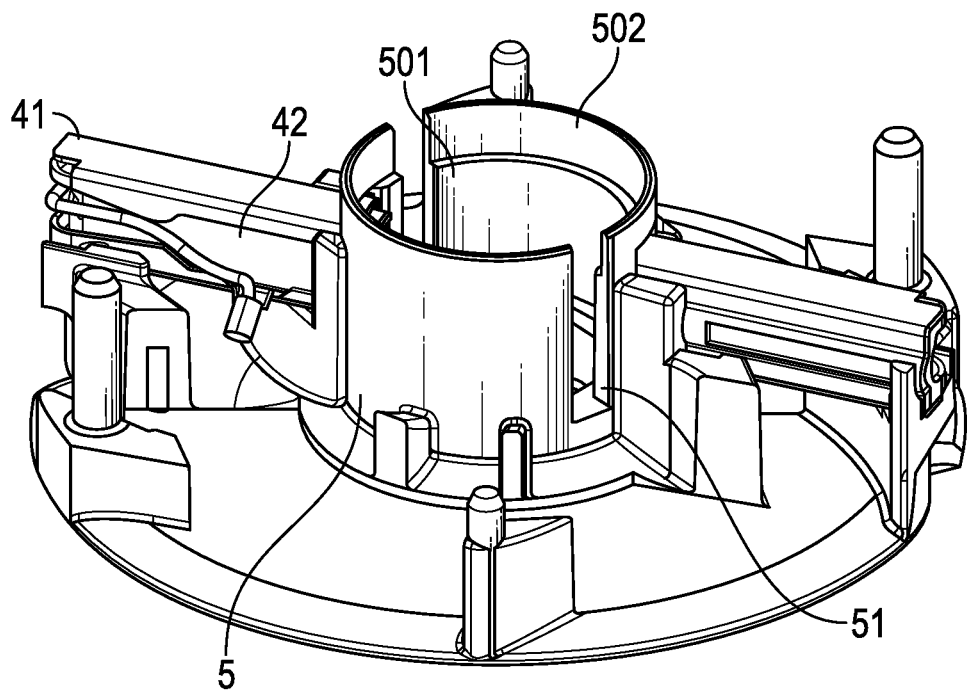

Main assembly parts are the rotor 1 and the bearing frame 2. The rotor 1 is supported by the ball bearing 6, which is assembled in the bearing frame 2, and by the bearing 8 at the opposite side of the axis. The brush assembly 4 is used to conduct electric current between the stationary wires and the commutator 3 which is fixed on the rotor shaft 11. The brush assembly 4 consists of a brush sleeve 41 and a brush 42.

Figure 3:
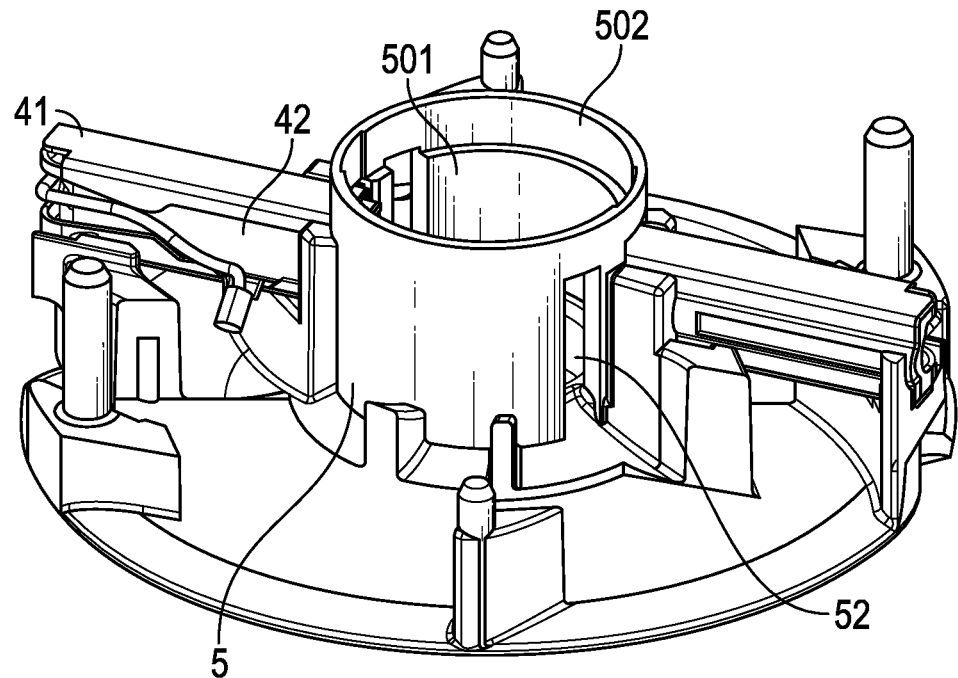
Figure 4A:
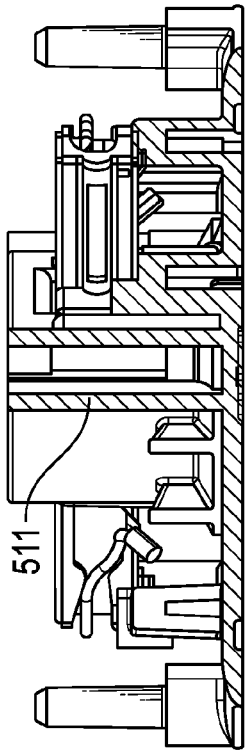
Figure 4B:
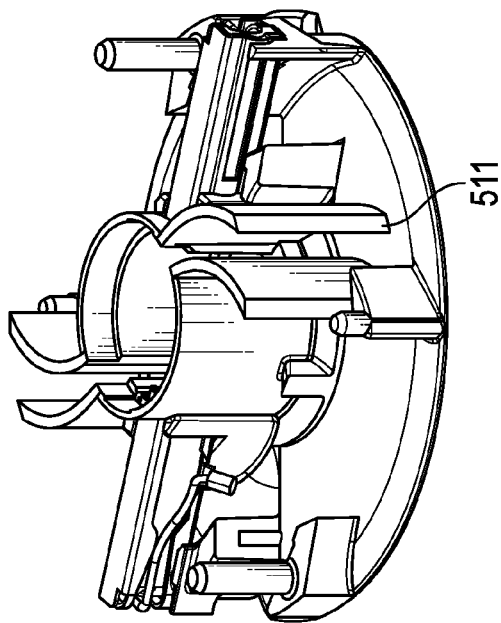
Figure 4C:
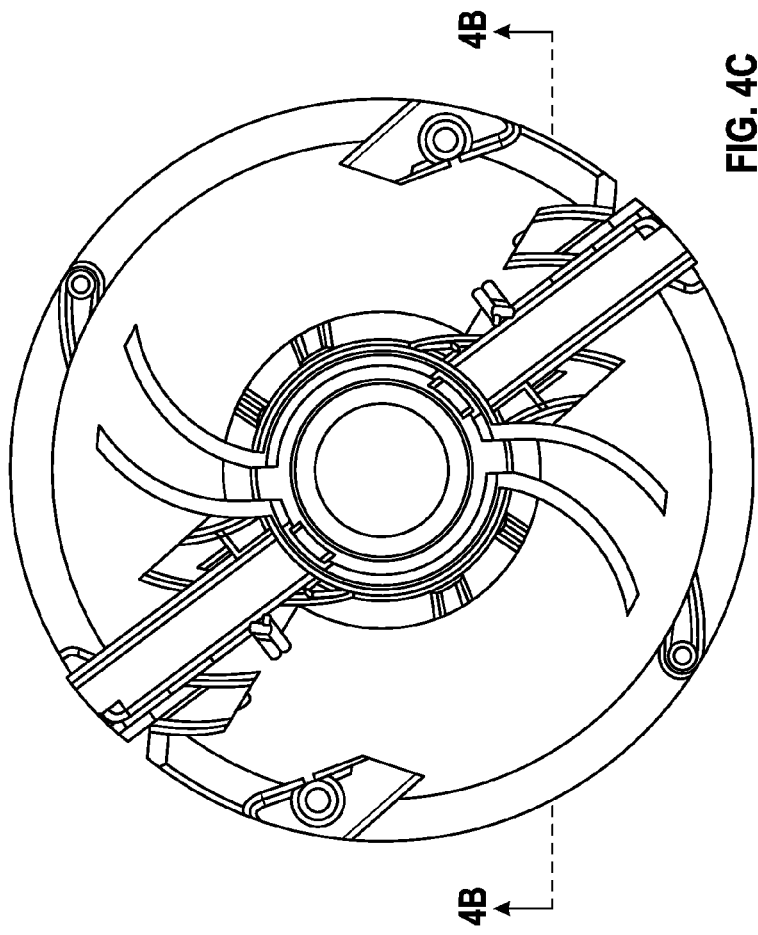
Figure 5B:
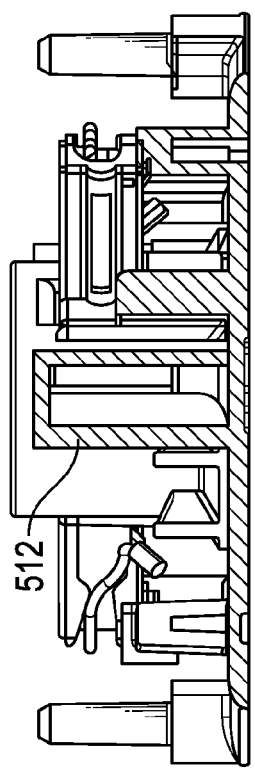
Figure 5C:
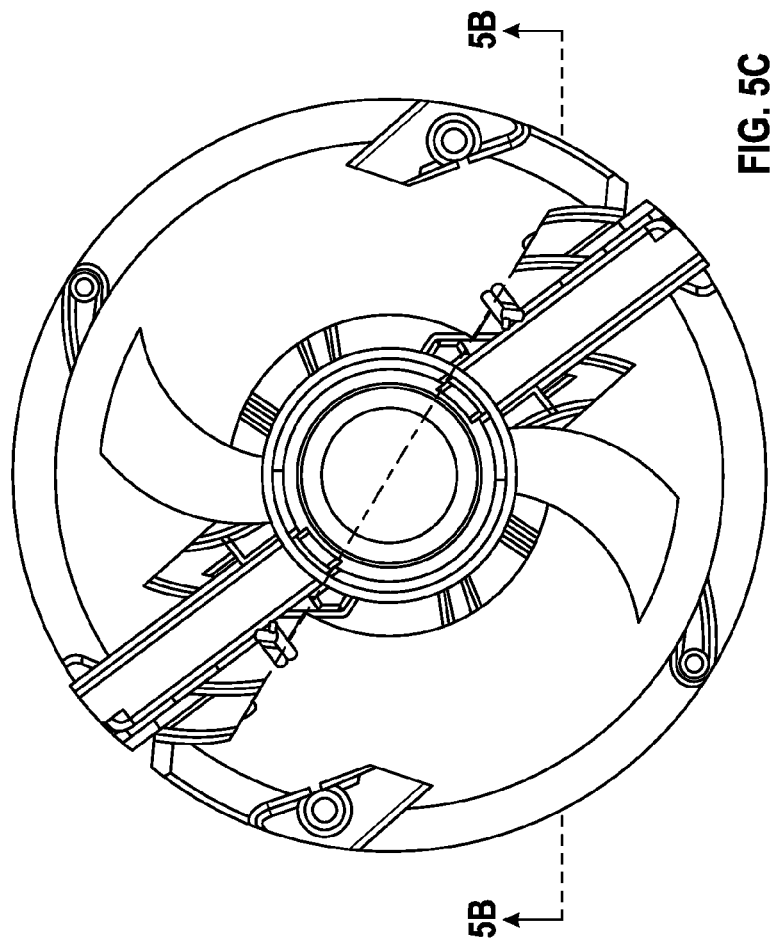
Figure 5A:
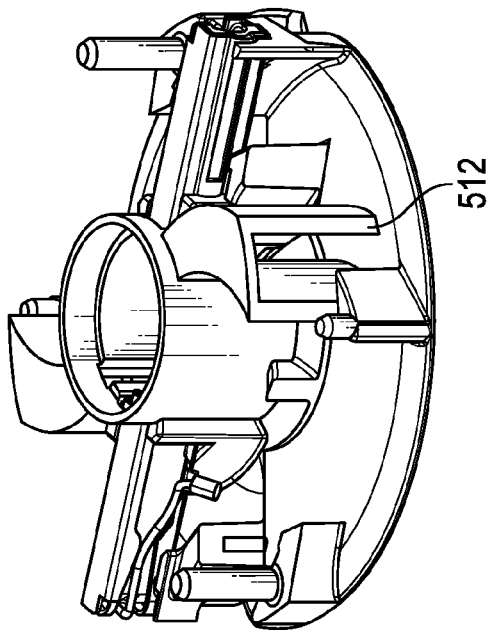

A spark protection shield is formed as a collar 5, surrounding the commutator 3 and it might be an integral part of the bearing frame 2 or it could be a separate assembly part. The collar 5 is a wall, extending from the bearing frame 2 and surrounding the commutator 3 in approximately its total height, i.e. including the commutator hooks. The inner wall of the collar might consist of two 2 cylindrical surfaces of different diameters. The surface with a smaller diameter 501 surrounds the main body of the commutator 3. The surface with a larger diameter 502 surrounds the commutator hooks 31. The gap in a radial direction between the commutator 3 and the collar 5 is up to 3 mm. The collar 5 has collar openings 51, 52. Openings 51, 52 could be of different shapes. As presented on FIG. 2, the opening 51 is of opened type, i.e. the opening 51 spreads to the top of the collar 5. As presented on FIG. 3, the opening 52 is of closed type, i.e. the opening 52 is interrupted on the top of the collar 5, meaning that the collar 5 is integral on its top. The total area of the openings 51, 52 is up to 20% of the commutator 3 active area. The commutator 3 active area is the area which is actually in contact with the brushes. Openings 51, 52 are positioned at an angle from 90° to 175° away from the brush in the direction of the rotation of the rotor 1.

Collar openings 51, 52 might or might not be extended into channels 511, 512. Channels 511, 512 as presented in the drawings 4 and 5, provide additional protection against sparking. The channel 511 is opened on the top. The channel 512 is on its top covered with a wall, spreading from the top of the collar 5. Channels 511, 512 cross section areas may rise from the collar 5 to the exhaust.

Even though the collar is equipped with the collar openings, carbon dust concentration near the bearing 6 is significantly higher comparing to motors without a collar. Despite the fact that bearing 6 is equipped with a sealing, carbon dust is still slightly penetrating into the bearing and polluting the bearing grease. This results in reduced life time of the ball bearing 6. To prevent this, anti-dust washer 7 made of non-conductive material, is introduced. It is centered on the rotor shaft; its axial position is assured with the ball bearing 6.

The invention claimed is:

1. A spark suppression shield for electric motors which relates to universal commutator motors and to permanent magnet DC motors operating in an environment containing flammable or explosive gases, said shield comprising a collar shaped as a wall and extending from a bearing frame and surrounding a commutator in approximately its total height, wherein the gap in radial direction between commutator and collar is up to 3 mm, the collar has collar openings, the total area of said openings is up to 20% of said commutator's active area, and said openings are positioned at an angle from 90 degrees to 175 degrees away from the commutator brush in the direction of rotation of the commutator rotor.

2. The spark suppression shield according to claim 1, where the collar openings are extended into channels.

3. The spark suppression shield according to claim 1, where the channel is opened on the top.

4. The spark suppression shield according to claim 1, where the channel is on its top covered with a wall, spreading from the top of the collar.

\* \* \* \* \*